(12) United States Patent  (10) Patent No.: US 7,520,184 B2
Uemura et al.  (45) Date of Patent: Apr. 21, 2009

(54) ANGULAR VELOCITY SENSOR (75) Inventors: Takeshi Uemura, Osaka (JP); Keisuke Kuroda, Osaka (JP); Masayoshi Murakami, Fukui (JP)

(73) Assignee: Panasonic Corporation, Osaka (JP)

( * ) Notice: Subject to any disclaimer, the term of this patent is extended or adjusted under 35 U.S.C. 154(b) by 27 days.

(21) Appl. No.: 10/589,954

(22) PCT Filed: Feb. 17, 2005

(86) PCT No.: PCT/JP2005/002465

§ 371 (c)(1),
(2), (4) Date: Aug. 18, 2006

(87) PCT Pub. No.: WO2005/080919

PCT Pub. Date: Sep. 1, 2005

(65) Prior Publication Data

US 2007/0151373 A1  Jul. 5, 2007

(30) Foreign Application Priority Data

Feb. 20, 2004 (JP) ............................. 2004-044268

(51) Int. Cl.
*G01L 3/02* (2006.01)
(52) U.S. Cl. ................................. 73/862.326
(58) Field of Classification Search ............. 73/862.326
See application file for complete search history.

(56) References Cited

U.S. PATENT DOCUMENTS 5,854,427 A * 12/1998 Terada et al. ............. 73/504.16
6,282,957 B1 * 9/2001 Akimoto et al. .......... 73/504.12
6,415,664 B2 * 7/2002 Iwaki et al. ............... 73/504.12
6,959,584 B2 * 11/2005 Nozoe et al. ................. 73/1.37
7,068,744 B2 * 6/2006 Watanabe .................... 375/346

FOREIGN PATENT DOCUMENTS

| JP | 60-188809 | 9/1985 |
|---|---|---|
| JP | 3-156312 | 7/1991 |
| JP | 7-128069 | 5/1995 |
| JP | 8-14915 | 1/1996 |
| JP | 9-145378 | 6/1997 |
| JP | 10-78326 | 3/1998 |
| JP | 11-44540 | 2/1999 |
| JP | 2000-193459 | 7/2000 |

* cited by examiner

*Primary Examiner*—Harshad Patel
*Assistant Examiner*—Octavia Davis
(74) *Attorney, Agent, or Firm*—Wenderoth, Lind & Ponack, L.L.P.

(57) ABSTRACT

An angular velocity sensor for precisely calculating an angular velocity by taking the mass balance of the transducer into account is provided. The sensor includes a tuning fork type transducer (23) having a pair of arm portions (22) at a shaft portion (21) and formed of a piezoelectric element, and a control circuit portion (24) that drives the transducer (23) and detects the angular velocity applied to the transducer (23). The control circuit portion (24) includes a correction circuit portion (35) that generates a correction signal to remove, as a noise component, a signal component of a sense signal (29) detected erroneously as if an angular velocity occurred when no angular velocity is occurring in the transducer (23), from signal components of the sense signal (29).

8 Claims, 12 Drawing Sheets

FIG.7A DRIVE SIGNAL (OUTPUT OF DRIVING CIRCUIT PORTION)

FIG.7B MONITOR SIGNAL (OUTPUT OF BPF IN MONITOR CIRCUIT PORTION)

FIG.7C DIFFERENTIAL SENSE SIGNAL (OUTPUT OF DIFFERENTIAL AMPLIFIER IN ANGULAR VELOCITY DETECTION CIRCUIT PORTION)

FIG.7D OUTPUT OF CLOCK GENERATION CIRCUIT

FIG.7E INPUT OF SYNCHRONOUS DETECTOR (OUTPUT OF PHASE SHIFTER)

FIG.7F OUTPUT OF SYNCHRONOUS DETECTOR

FIG.7G OUTPUT OF LPF (ANGULAR VELOCITY SIGNAL)

FIG. 8A DRIVE SIGNAL (OUTPUT OF DRIVING CIRCUIT PORTION)

FIG. 8B MONITOR SIGNAL (OUTPUT OF BPF IN MONITOR CIRCUIT PORTION)

FIG. 8C DIFFERENTIAL SENSE SIGNAL (OUTPUT OF DIFFERENTIAL AMPLIFIER IN ANGULAR VELOCITY DETECTION CIRCUIT PORTION)

SENSE VOLTAGE = FIRST NOISE COMPONENT + SECOND NOISE COMPONENT

FIG. 8D OUTPUT OF CLOCK GENERATION CIRCUIT

FIG. 8E INPUT OF SYNCHRONOUS DETECTOR (OUTPUT OF PHASE SHIFTER)

FIG. 8F OUTPUT OF SYNCHRONOUS DETECTOR

FIG. 8G OUTPUT OF LPF (ANGULAR VELOCITY SIGNAL)

ANGULAR VELOCITY DETECTION ERROR OCCURS DUE TO FIRST NOISE COMPONENT AND SECOND NOISE COMPONENT

FIG.9A
DRIVE SIGNAL
(OUTPUT OF
DRIVING
CIRCUIT
PORTION)

FIG.9B
MONITOR SIGNAL
(OUTPUT OF BPF
IN MONITOR
CIRCUIT PORTION)

FIG.9C
DIFFERENTIAL
SENSE SIGNAL
(OUTPUT OF
DIFFERENTIAL
AMPLIFIER IN
ANGULAR VELOCITY
DETECTION
CIRCUIT PORTION)

FIG.9D
OUTPUT OF
CLOCK
GENERATION
CIRCUIT

FIG.9E
INPUT OF
SYNCHRONOUS
DETECTOR
(OUTPUT OF
PHASE SHIFTER)

FIG.9F
OUTPUT OF
SYNCHRONOUS
DETECTOR

FIG.9G
OUTPUT OF LPF
(ANGULAR
VELOCITY SIGNAL)

ANGULAR VELOCITY SENSOR

BACKGROUND OF THE INVENTION

1. Field of the Invention

The present invention relates to an angular velocity sensor used for posture control, navigation, or the like of a mobile unit such as an airplane, an automobile, a robot, a ship, and a vehicle.

2. Description of the Related Art

Figure 10:
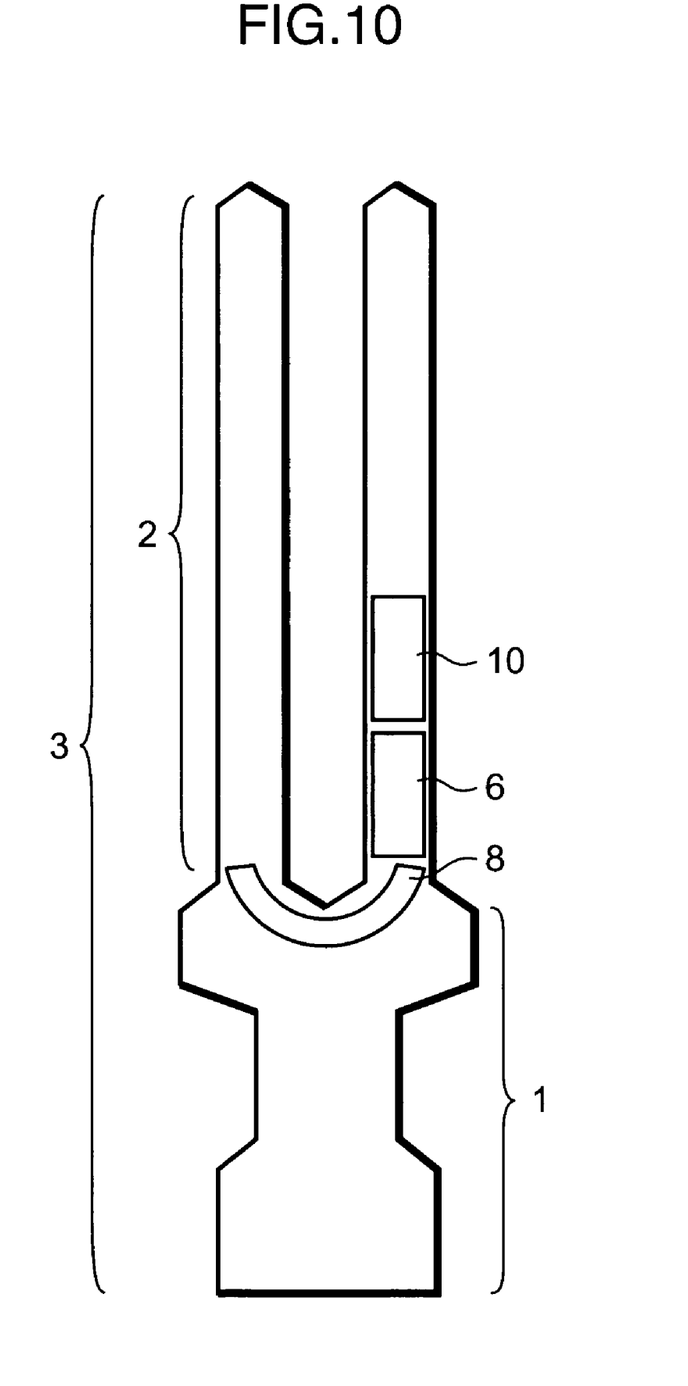
FIG. 10 is a plan view of a transducer in a conventional angular velocity sensor.
Figure 11:
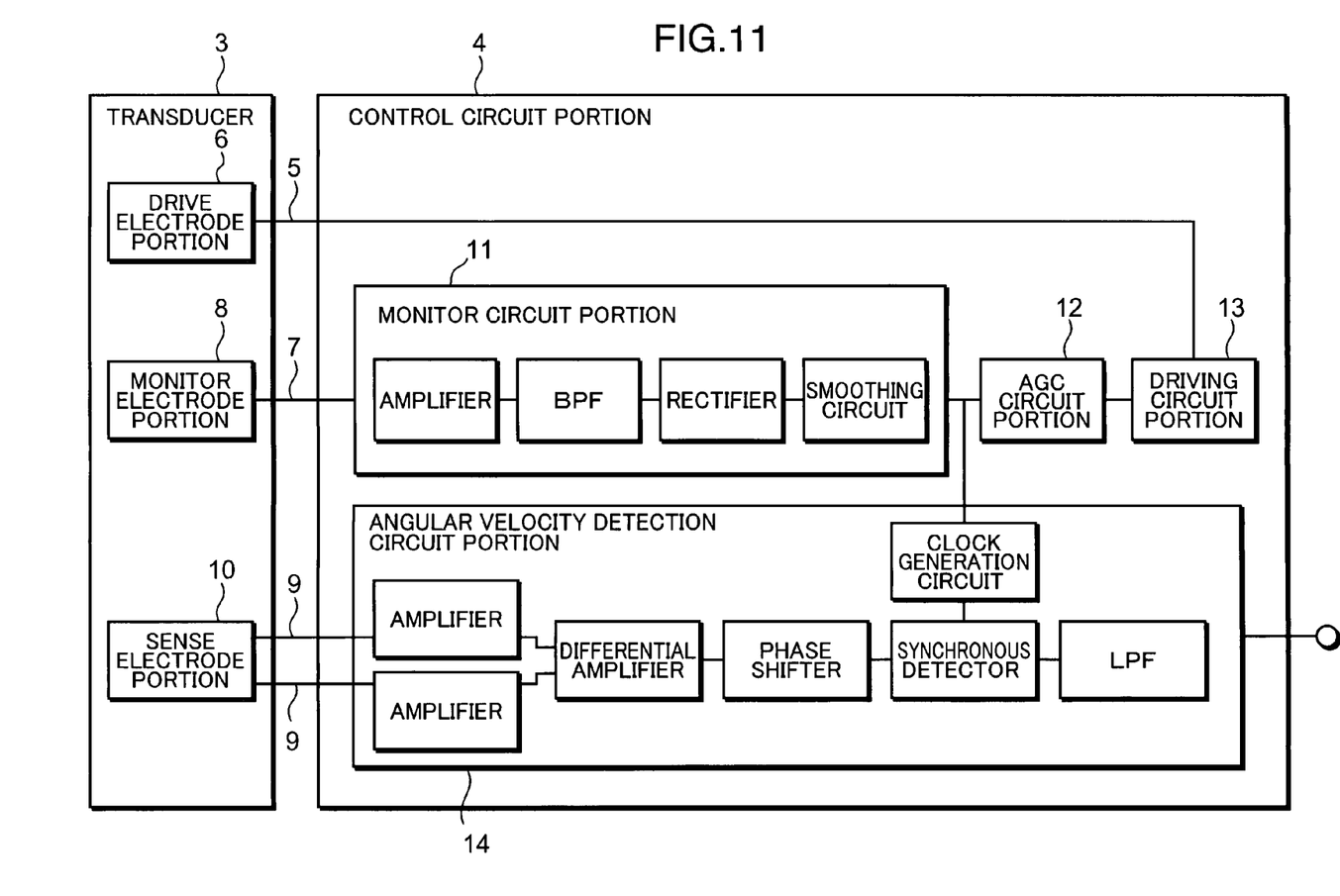
FIG. 11 is a block diagram of the conventional angular velocity sensor.

Hereinafter, an angular velocity sensor in the related art will be described with reference to the drawings. FIG. 10 is a plan view of a transducer in the angular velocity sensor in the related art. FIG. 11 is a block diagram of the angular velocity sensor. FIG. 12 shows wave form charts of input and output signals regarding respective electrodes while the angular velocity sensor is in an operating state.

Referring to FIG. 10 and FIG. 11, the angular velocity sensor includes a tuning fork type transducer 3 having a pair of arm portions 2 at a shaft portion 1 and formed of a piezoelectric element and a control circuit portion 4 that drives the transducer 3 and detects the angular velocity applied to the transducer 3.

The transducer 3 includes a drive electrode portion 6 into which is inputted a drive signal 5 to oscillate the transducer 3 at a specific frequency, a monitor electrode portion 8 that detects the oscillation frequency of the transducer 3 and outputs the detected oscillation frequency as a monitor signal 7, and a sense electrode portion 10 that detects the angular velocity applied to the transducer 3 and outputs the detected angular velocity as sense signals 9 synchronized with the monitor signal 7. The drive electrode portion 6 and the sense electrode portion 10 are formed at the arm portions 2 and the monitor electrode portion 8 is formed in proximity to the boundary between the shaft portion 1 and the arm portions 2.

The control circuit portion 4 includes a monitor circuit portion 11 connected to the monitor electrode portion 8 of the transducer 3, an AGC circuit portion 12 connected to the monitor circuit portion 11, a driving circuit portion 13 connected to the AGC circuit portion 12, and an angular velocity detection circuit portion 14 connected to the sense electrode portion 10 of the transducer 3.

The monitor circuit portion 11 is composed of an amplifier into which is inputted the monitor signal 7 outputted from the monitor electrode portion 8, a band-pass filter (BPF) into which is inputted an output signal of the amplifier, a rectifier into which is inputted an output signal of the band-pass filter, and a smoothing circuit into which is inputted an output signal of the rectifier.

The AGC circuit portion 12 receives an output signal from the smoothing circuit in the monitor circuit portion 11, and according to the input signal, possesses the function of amplifying or attenuating an output signal from the band-pass filter in the monitor circuit portion 11. The driving circuit portion 13 outputs an amplified or attenuated output signal from the band-pass filter to the drive electrode portion 6 as the drive signal 5 used for driving the transducer 3. The angular velocity detection circuit portion 14 detects the angular velocity based on the sense signals 9 outputted from the sense electrode portion 10.

The transducer 3 is driven as it starts to oscillate upon input of the drive signal 5 from the drive electrode portion 6, and the oscillations are outputted from the monitor electrode portion 8 in the form of the monitor signal 7. The drive signal 5 is a sine wave with a specific frequency, and in a case where the amplitude of the drive signal 5 (a sine wave with a specific frequency) is different from the amplitude of the monitor signal 7 (a sine wave with the oscillation frequency induced by oscillations of the transducer 3), control is conducted in such a manner that the amplitude of the monitor signal 7 and the amplitude of the drive signal 5 coincide with each other.

More specifically, in a case where the amplitude of the monitor signal 7 is smaller than the amplitude of the drive signal 5, a correction signal to decrease the amplitude of the drive signal 5 is added to the drive signal 5, and in a case where the amplitude of the monitor signal 7 is larger than the amplitude of the drive signal 5, a correction signal to increase the amplitude of the drive signal 5 is added to the drive signal 5. These functions are performed by the AGC circuit portion 12 and the driving circuit portion 13, and oscillations of the transducer 3 are maintained at constant amplitude.

Figure 12A:
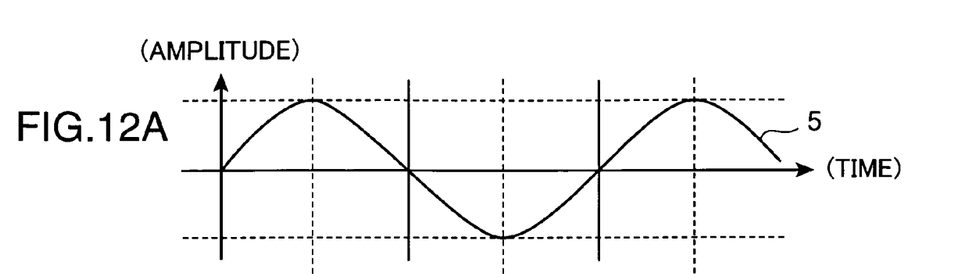
FIGS. 12A, 12B and 12C, respectively, show wave form charts of a drive signal, a monitor signal, and a sense signal in the conventional angular velocity sensor.
Figure 12B:
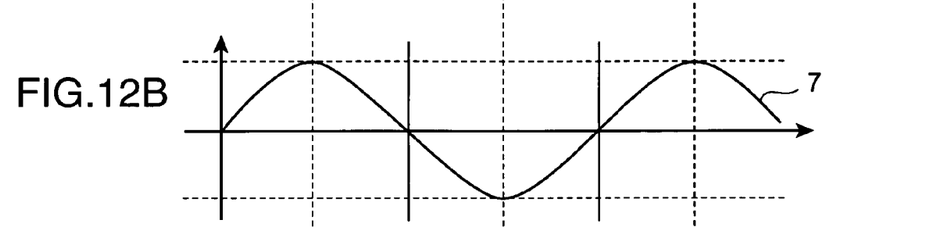
Figure 12C:
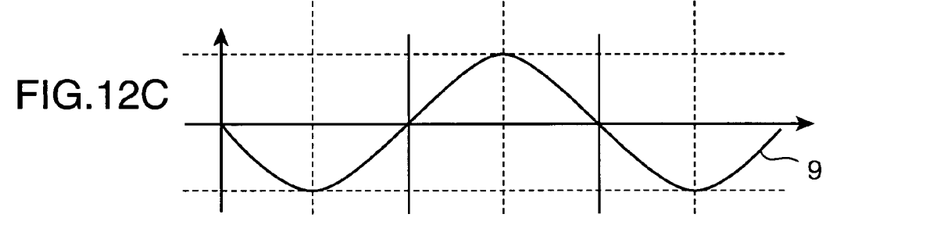

In the angular velocity sensor described above, the relationship among the drive signal 5, the monitor signal 7, and the sense signal 9 is shown in FIG. 12A, FIG. 12B and FIG. 12C. That is to say, with respect to the drive signal 5 which is a sine wave with a specific frequency as shown in FIG. 12A, the monitor signal 7 which is a sine wave with an oscillation frequency induced by oscillations of the transducer 3 is outputted in phase with the drive signal 5 as shown in FIG. 12B. As shown in FIG. 12C, the sense signal 9 which is a sine wave whose phase leads by 90 degrees is outputted in synchronization with the monitor signal 7 according to the angular velocity applied to the transducer 3.

As prior art document information related to the invention of the present application, for example, JP-A-2000-193459 is known.

With the above conventional configuration, a synchronous frequency synchronized with the monitor signal 7 and induced by the angular velocity applied to the transducer 3 is detected, and the synchronous frequency is outputted from the sense electrode portion 10 in the form of the sense signals 9. However, even when no angular velocity is occurring in the transducer 3, the sense signals 9 may be outputted because the occurrence of the angular velocity is detected erroneously depending on a mass balance of the transducer 3. This configuration therefore has a problem that the angular velocity cannot be calculated correctly. The mass balance of the transducer 3 referred to herein means, for example, the balance of masses of respective arm portions 2 for the tuning fork type transducer 3 in the shape of a letter U, a letter H or the like, and for a transducer other than the tuning fork type and shaped like a column or cone, it means the balance of mass in reference to the center of gravity.

SUMMARY OF THE INVENTION

The present invention is to solve the foregoing problems, and therefore has an object to provide an angular velocity sensor capable of calculating the angular velocity precisely by taking the mass balance of the transducer into account.

An angular velocity sensor of the present invention includes a transducer and a control circuit portion that drives the transducer and detects an angular velocity applied to the transducer. In the transducer, a drive electrode portion into which is inputted a drive signal to oscillate the transducer at a specific frequency, a monitor electrode portion that detects an oscillation frequency of the transducer and outputs the detected oscillation frequency as a monitor signal, and a sense electrode portion that outputs a sense signal which is generated due to an angular velocity applied to the transducer and is synchronized with the monitor signal, are formed. A correction circuit portion is provided that removes, as a noise component, a signal component of the sense signal detected erroneously as if an angular velocity occurred when no angular velocity is occurring in the transducer, from a signal component of the sense signal.

With this configuration, the signal component of the sense signal detected erroneously as if an angular velocity occurred when no angular velocity is occurring in the transducer is deemed as the noise component, and removed from the signal components of the sense signal detected by the sense electrode portion. A noise component due to the mass balance of the transducer is thus removed from the sense signal, which in turn enables the angular velocity to be detected precisely.

DETAILED DESCRIPTION OF THE INVENTION

Figure 1:
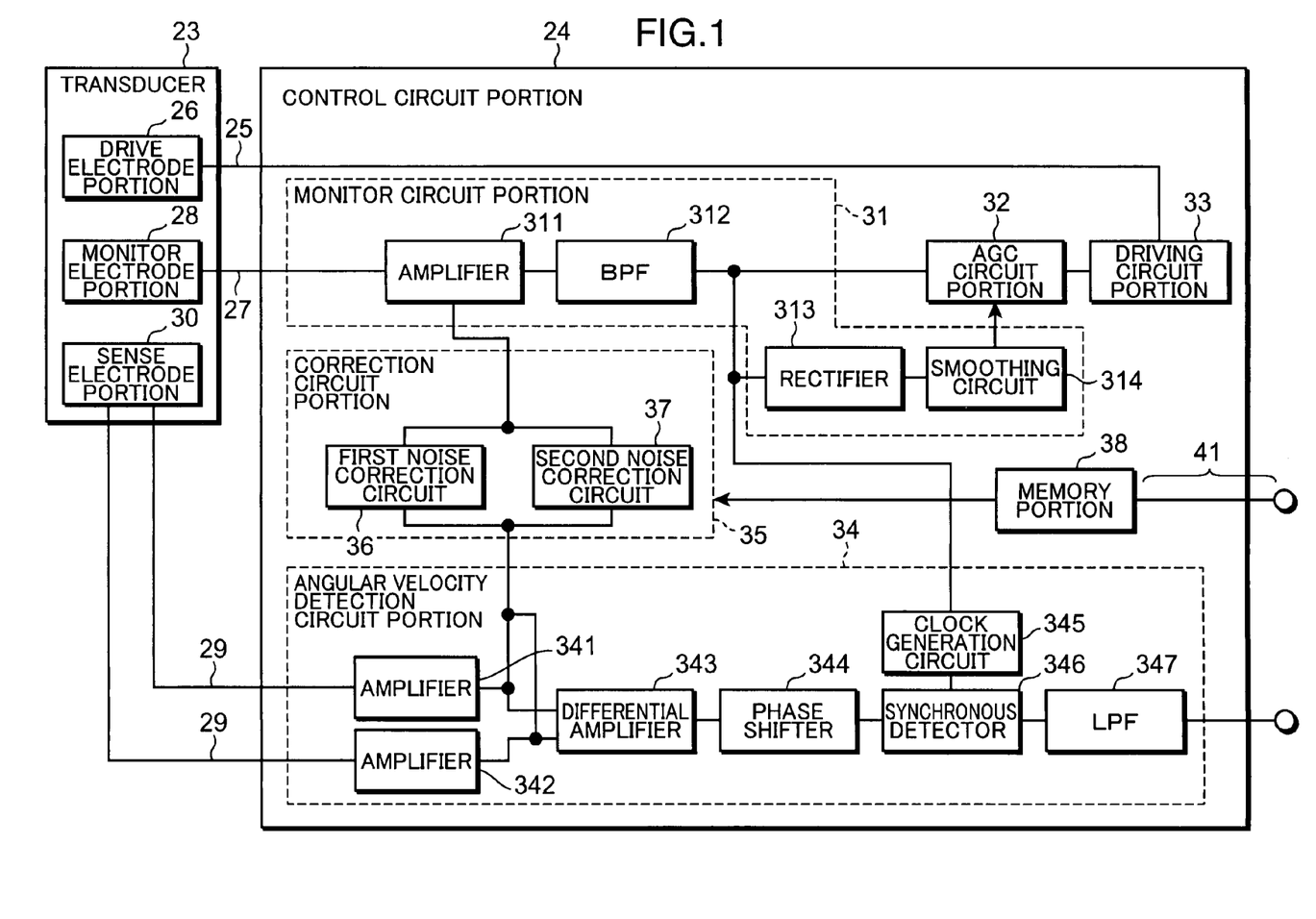
FIG. 1 is a block diagram of an angular velocity sensor according to one embodiment of the present invention.
Figure 2:
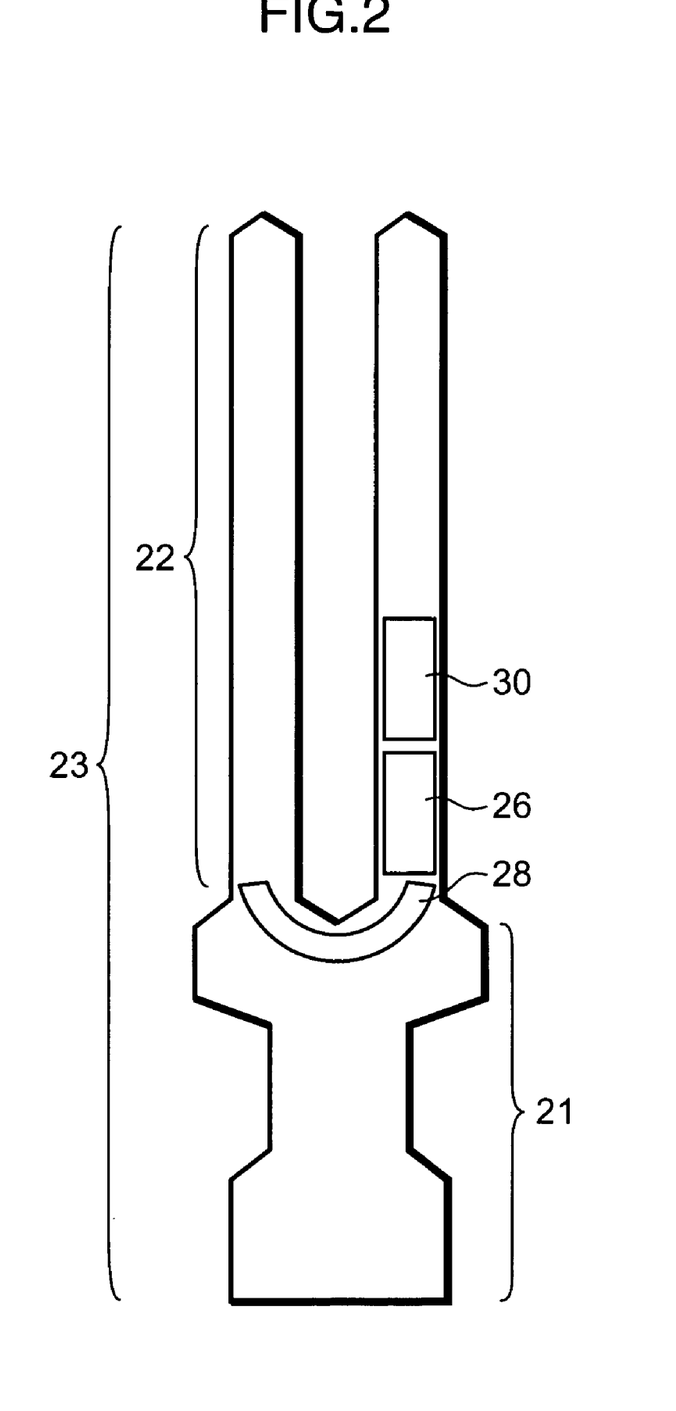
FIG. 2 is a plan view of a transducer used in the angular velocity sensor.
Figures 3A, 3B:
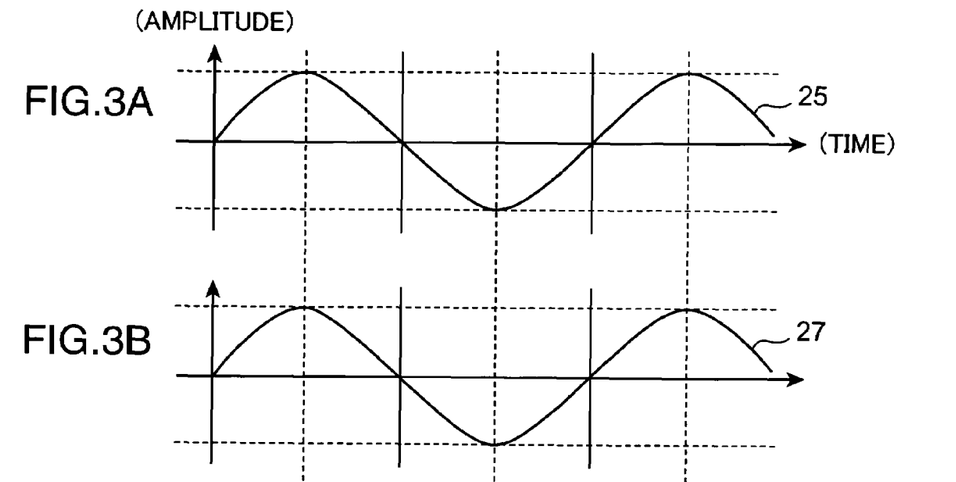
FIGS. 3A, 3B and 3C, respectively, show wave form charts of a drive signal, a monitor signal, and a sense signal in the angular velocity sensor.
Figure 3C:
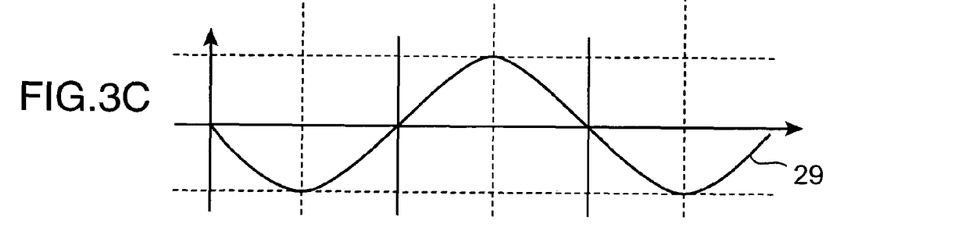
Figure 4:
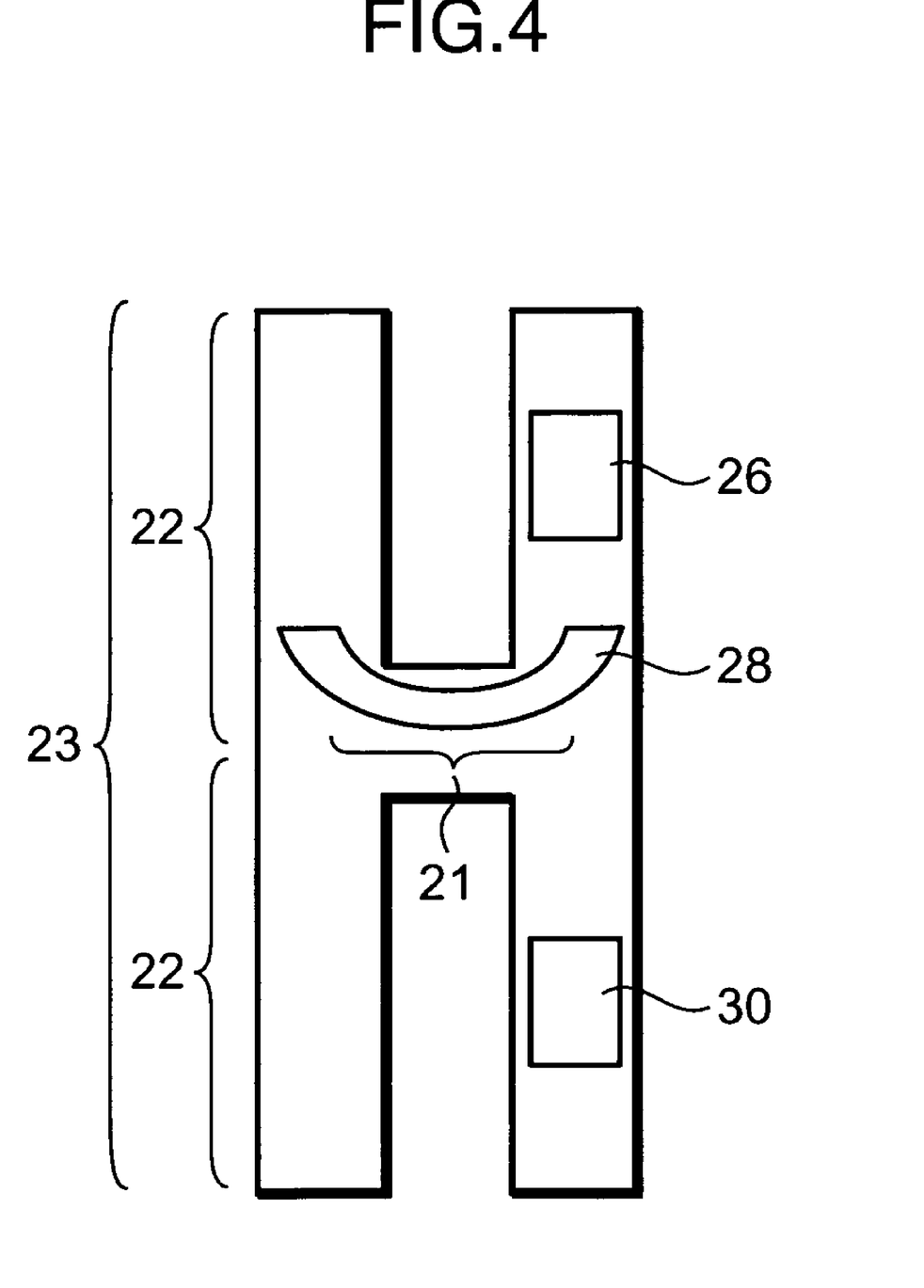
FIG. 4 is a plan view of a tuning fork type transducer in the shape of a letter H.
Figure 5A:
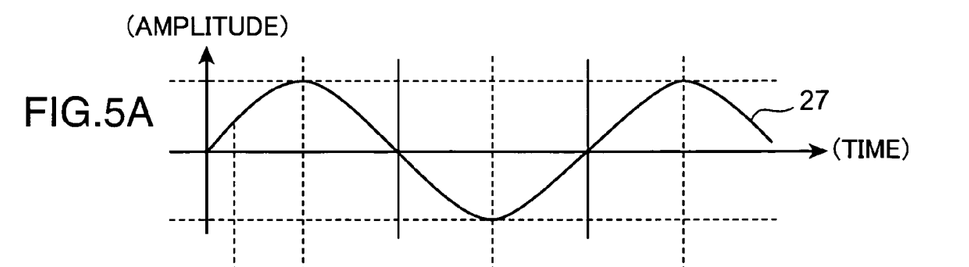
FIGS. 5A and 5B, respectively, show wave form charts of a drive signal and a monitor signal in the angular velocity sensor in a case where a phase of the monitor signal is shifted with respect to the drive signal.
Figure 5B:
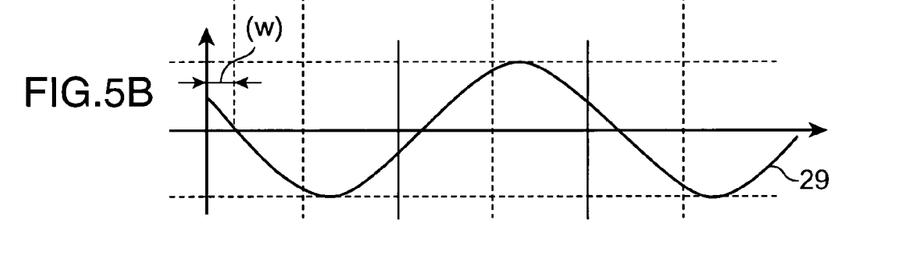
Figure 6:
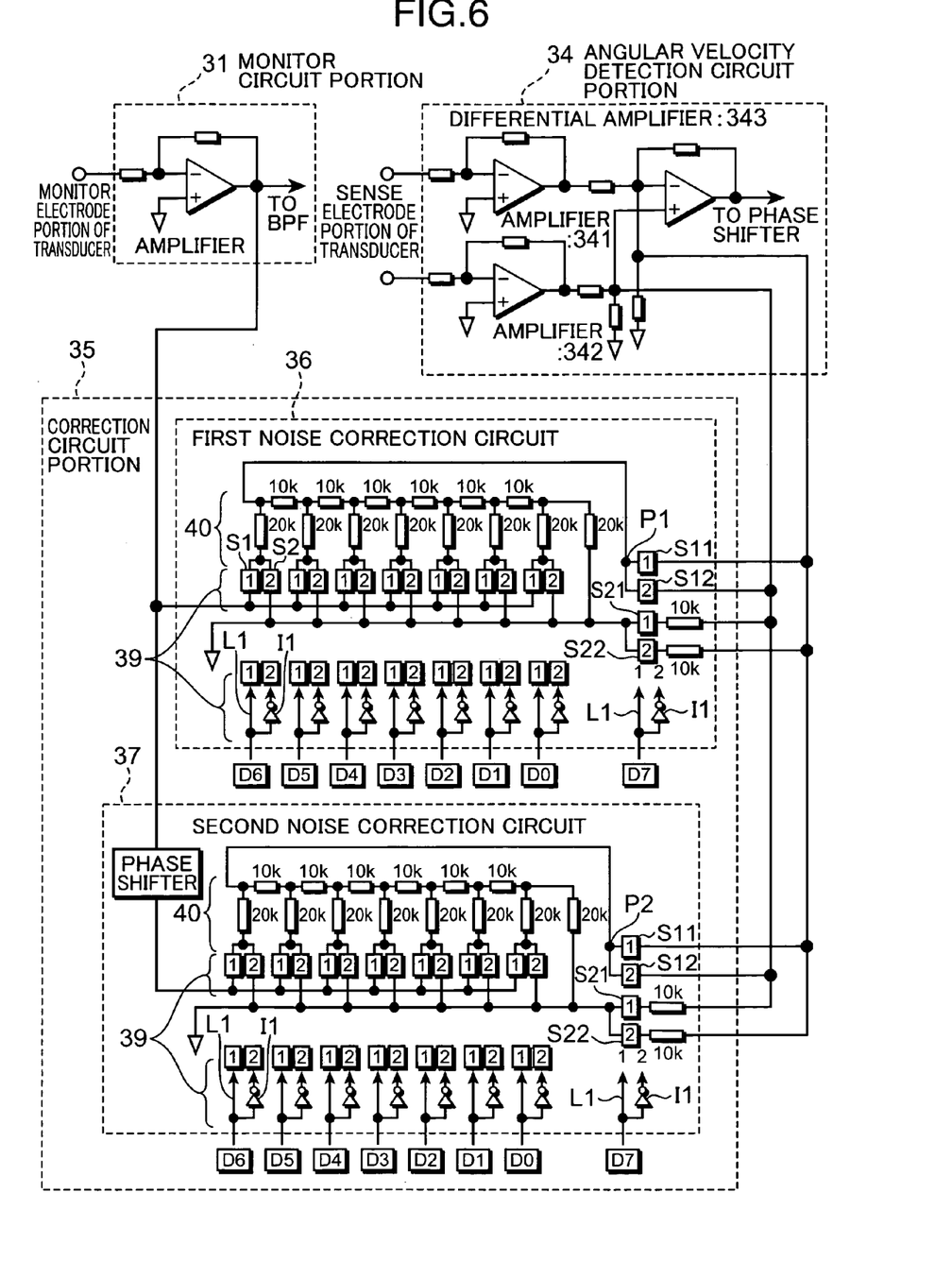
FIG. 6 is a circuit diagram showing a correction circuit portion and amplifiers connected thereto in the angular velocity sensor.

Hereinafter, an angular velocity sensor according to one embodiment of the present invention will be described with reference to the drawings. FIG. 1 is a block diagram of the angular velocity sensor according to one embodiment of the present invention. FIG. 2 is a plan view of a transducer used in the angular velocity sensor. FIGS. 3A to 3C show wave form charts of input and output signals regarding respective electrode portions while the angular velocity sensor is in an operating state. FIG. 4 is a plan view of a transducer used in the angular velocity sensor in the shape of a letter H. FIGS. 5A and 5B, respectively, show wave form charts of a drive signal and a monitor signal in the angular velocity sensor in a case where a phase of the monitor signal is shifted with respect to the drive signal. FIG. 6 is a circuit diagram showing a correction circuit portion in the angular velocity sensor.

Referring to FIG. 1 and FIG. 2, the angular velocity sensor according to one embodiment of the present invention is composed of a tuning fork type transducer 23 having a pair of arm portions 22 at a shaft portion 21 and formed of a piezo-electric element, and a control circuit portion 24 that drives the transducer 23 and detects the angular velocity applied to the transducer 23.

The transducer 23 includes a drive electrode portion 26 into which is inputted a drive signal 25 to oscillate the transducer 23 at a specific frequency, a monitor electrode portion 28 that detects the oscillation frequency of the transducer 23 and outputs the detected oscillation frequency as a monitor signal 27, and a sense electrode portion 30 that outputs sense signals 29 which are generated due to the angular velocity applied to the transducer 23 and are synchronized with the monitor signal 27. The drive electrode portion 26 and the sense electrode portion 30 are formed at the arm portions 22 and the monitor electrode portion 28 is formed in proximity to the boundary between the shaft portion 21 and the arm portions 22.

The control circuit portion 24 includes a monitor circuit portion 31 connected to the monitor electrode portion 28 of the transducer 23, an automatic gain control (AGC) circuit portion 32 connected to the monitor circuit portion 31, a driving circuit portion 33 connected to the AGC circuit portion 32, and an angular velocity detection circuit portion 34 connected to the sense electrode portion 30 of the transducer 23.

The monitor circuit portion 31 is composed of an amplifier 311 into which is inputted the monitor signal 27 outputted from the monitor electrode portion 28, a band-pass filter (BPF) 312 into which is inputted an output signal of the amplifier 311, a rectifier 313 into which is inputted an output signal of the band-pass filter 312, and a smoothing circuit 314 into which is inputted an output signal of the rectifier 313.

The AGC circuit portion 32 receives an output signal of the smoothing circuit 314, and according to this input signal, controls the driving circuit portion 33 to amplify or attenuate an output signal of the band-pass filter 312.

The driving circuit portion 33 amplifies or attenuates the output signal from the band-pass filter 312 under the control of the AGC circuit portion 32, and outputs the result to the drive electrode portion 26 as the drive signal 25 for driving the transducer 23. The angular velocity detection circuit portion 34 detects the angular velocity from the sense signals 29 outputted from the sense electrode portion 30.

The transducer 23 is driven as it starts to oscillate upon input of the drive signal 25 from the drive electrode portion 26, and the oscillations are outputted from the monitor electrode portion 28 as the monitor signal 27. The drive signal 25 is a sine wave with a specific frequency, and in a case where the amplitude of the drive signal 25 (a sine wave with a specific frequency) is different from the amplitude of the monitor signal 27 (a sine wave with the oscillation frequency induced by oscillations of the transducer 23), control is conducted in such a manner that the amplitude of the monitor signal 27 and the amplitude of the drive signal 25 coincide with each other.

More specifically, in a case where the amplitude of the monitor signal 27 is smaller than the amplitude of the drive signal 25, a correction signal to decrease the amplitude of the drive signal 25 is added to the drive signal 25, and in a case where the amplitude of the monitor signal 27 is larger than the amplitude of the drive signal 25, a correction signal to increase the amplitude of the drive signal 25 is added to the drive signal 25. The oscillations of the transducer 23 are consequently maintained at constant amplitude. These functions are performed by the AGC circuit portion 32 and the driving circuit portion 33.

In the angular velocity sensor described above, the relationship among the drive signal 25, the monitor signal 27, and the sense signal 29 is shown in FIG. 3. That is to say, with respect to the drive signal 25 which is a sine wave with a specific frequency as shown in FIG. 3A, the monitor signal 27 which is a sine wave with the oscillation frequency induced by oscillations of the transducer 23 is outputted in phase with the drive signal 25 as shown in FIG. 3B. As shown in FIG. 3C, the sense signal 29 which is a sine wave whose phase leads by 90 degrees is outputted in synchronization with the monitor signal 27 in response to the angular velocity applied to the transducer 23. The reason why the phase of the sense signal 29 leads by 90 degrees with respect to the monitor signal 27 is because a Coriolis force is induced by charges generated at the sense electrode portion 30.

Further, the control circuit portion 24 is provided with a correction circuit portion 35 that removes a noise component from signal components of the sense signal 29 by deeming a signal component of the sense signal 29 detected erroneously as if an angular velocity occurred when no angular velocity is occurring in the transducer 23 as the noise component.

The noise component includes a first noise component and a second noise component. The first noise component is generated in a state where the phase of the sense signal 29 is not shifted with respect to the phase of the monitor signal 27 as shown in FIGS. 3A and 3B.

The first noise component is generated due to a mass balance of the transducer 23. For example, in the case of a tuning fork type transducer 23 in the shape of a letter U or a letter H, the first noise component is generated in the presence of a variance in mass between the respective arm portions 22. The first noise component is generated not only in the tuning fork type, but also in a column-shaped or cone-shaped transducer 23 when there is a mass difference in reference to the center of gravity. As a tuning fork type transducer 23 in the shape of a letter H, the one shown in FIG. 4 has been used. In this transducer 23, four arm portions 22 are provided to the shaft portion 21, and the drive electrode portion 26 and the sense electrode portion 30 are formed at the arm portions 22 while the monitor electrode portion 28 is formed at the shaft portion 21.

The second noise component is the one except for the first noise component, and is generated due to a state where the phase of the monitor signal 27 shown in FIG. 3B and the phase of the sense signal 29 shown in FIG. 3C are shifted from each other, i.e. due to a phase difference (W) as shown in FIGS. 5A and 5B. An increase of the internal temperature of the control circuit portion 24 gives rise to such a state in which the phases are shifted from each other.

The correction circuit portion 35 includes a first noise correction circuit 36 for removing the first noise component and a second noise correction circuit 37 for removing the second noise component. FIG. 6 is a detailed circuit diagram of the correction circuit 35. Each of the first noise correction circuit 36 and the second noise correction circuit 37 is formed by combining a switch portion 39 having internal resistance and a ladder resistor 40. The resistance value of the ladder resistor 40 is set to be at least 100 times as large as the resistance value of the internal resistance of the switch portion 39, such as a transistor.

The switch portion 39 includes two switches S1 and S2 connected to each resistor of 20 k ohms in the ladder resistor, switches S11, S12, S21, and S22, data lines L1 to output data from a memory portion 38 to the switches S1, inverters I1 to invert data from the memory portion 38 to be outputted to the switches S2, etc.

For example, among 8-bit data outputted from the memory portion 38, data D6 at the seventh bit is inputted into the first data line L1 from the left in the switch portion 39. The switches S1 and S2 are switched ON/OFF exclusively according to the data D6, so that the first resistor with 20 k ohms from the left in the ladder resistor 40 is connected to the output terminal side of the monitor circuit portion 31 or to the ground side denoted by an inverted triangle mark.

The switches S11 and S12 on the right side of the switch portion 39 are switched ON/OFF exclusively according to data D7, and the switches S21 and S22 are switched ON/OFF exclusively according to the data D7, so that the output terminal P1 of the ladder resistor 40 is connected to the inverting input terminal or the non-inverting input terminal of a differential amplifier 343. The output terminal P1 of the ladder resistor 40 in the first noise correction circuit 36 is thus connected to the inverting input terminal of the differential amplifier 343, while the output terminal P2 of the ladder resistor 40 in the second noise correction circuit 37 is connected to the non-inverting input terminal of the differential amplifier 343. Alternatively, the output terminal P1 of the ladder resistor 40 in the first noise correction circuit 36 is connected to the non-inverting input terminal of the differential amplifier 343, and the output terminal P2 of the ladder resistor 40 in the second noise correction circuit 37 is connected to the inverting input terminal of the differential amplifier 343.

In other words, the first noise correction circuit 36 adjusts the resistance value of the ladder resistor 40 according to data stored in the memory portion 38, and generates a correction signal by attenuating an output signal from the amplifier 311, after which it superimposes this correction signal on both sense signals outputted from the amplifiers 341 and 342, thereby constantly removing the first noise component contained in the both sense signals.

The second noise correction circuit 37 adjusts the resistance value of the ladder resistor 40 according to data stored in the memory portion 38, and generates a correction signal by attenuating an output signal from the amplifier 311, after which it superimposes this correction signal on the sense signals outputted from the amplifiers 341 and 342, thereby constantly removing the second noise component contained in the both sense signals.

The memory portion 38 stores data used by the first noise correction circuit 36 when generating a correction signal to remove the first noise component from the sense signals, and also stores data used by the second noise correction circuit 37 when generating a correction signal to remove the second noise component from the sense signals. For the data stored in the memory portion 38, the value obtained empirically is adopted, and it is written into the memory portion 38 via a noise signal terminal 41 at the time of shipment from the factory or the like. Also, an EEPROM or the like is adopted as the memory portion 38.

The monitor signal 27 and the sense signals 29 are amplified, respectively, in the amplifier 311 and the amplifiers 341 and 342 of FIG. 1, and the degrees of amplification are set to be almost equal. The reason why two amplifies 341 and 342 are provided as the amplifier for the sense signal 29 outputted from the sense electrode portion 30 is because two sense electrodes 30 are provided.

The angular velocity detection circuit portion 34 shown in FIG. 1 includes amplifiers 341 and 342, a differential amplifier 343, a phase shifter 344, a clock generation circuit 345, a synchronous detector 346, and a low-pass filter (LPF) 347. The amplifier 341 amplifies the sense signal 29 outputted from one of two sense electrode portions 30, and the amplifier 342 amplifies the sense signal 29 outputted from the other sense electrode 30, and each outputs the result to the differential amplifier 343. The differential amplifier 343 amplifies a difference between a signal made by superimposing the correction signal outputted from the correction circuit portion 35 on the sense signal outputted from the amplifier 341 and a signal made by superimposing the correction signal outputted from the correction circuit portion 35 on the sense signal outputted from the amplifier 342, and outputs the result to the phase shifter 344 as differential sense signal.

The correction signal outputted from the correction circuit portion 35 removes the first noise component and the second noise component contained in the both sense signals by being superimposed on the sense signal outputted from the amplifier 341 and the sense signal outputted from the amplifier 342.

The phase shifter 344 advances the phase of a differential sense signal outputted from the differential amplifier 343 by 90 degrees. The clock generation circuit 345 generates a clock signal in synchronization with the monitor signal outputted from the band-pass filter 312 and in the same cycle as that of the monitor signal. The synchronous detector 346 multiplies a clock signal outputted from the clock generation circuit 345 and a signal outputted from the phase shifter 344, and outputs the result to the low-pass filter 347. The low-pass filter 347 removes a high frequency component of the signal outputted from the phase shifter 344 and outputs an angular velocity signal.

Figure 7A:
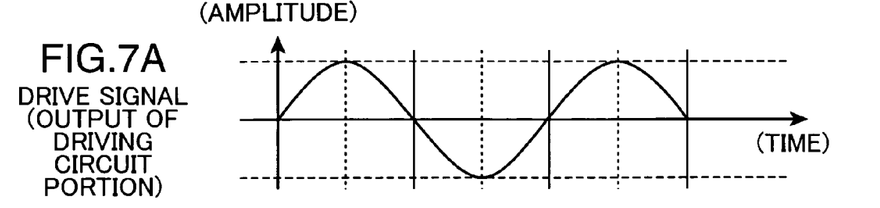
FIGS. 7A, 7B, 7C, 7D, 7E, 7F and 7G show wave form charts of signals in an angular velocity sensor when no angular velocity is applied to an ideal transducer which is in balance of mass.
Figure 7B:
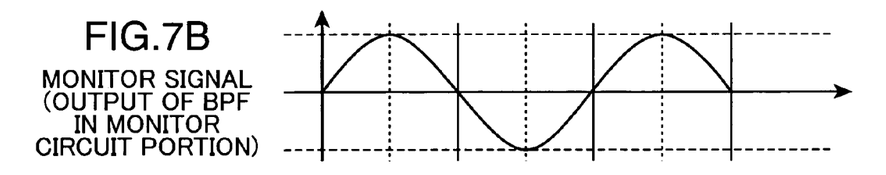
Figure 7C:
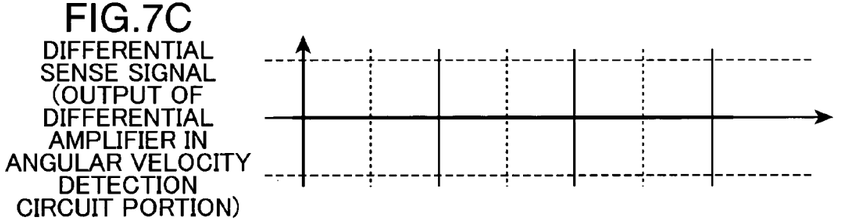
Figure 7D:
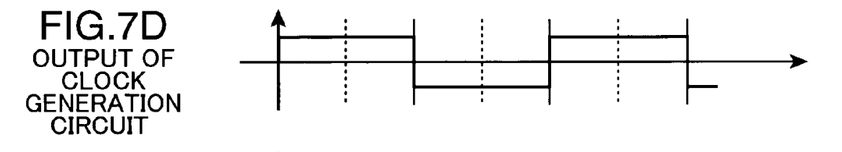
Figure 7E:
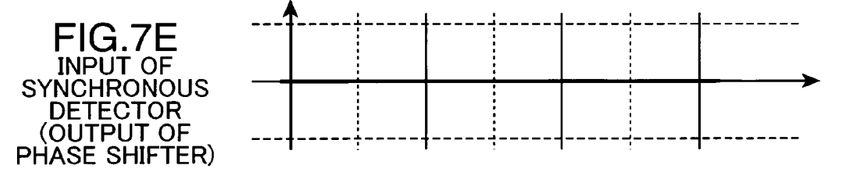
Figure 7F:
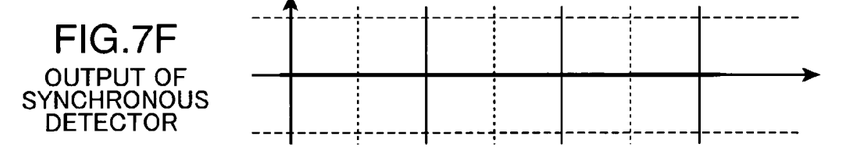
Figure 7G:
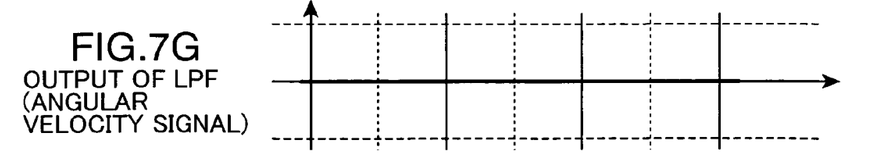

Operations of the angular velocity sensor will now be described using the circuit diagram shown in FIG. 1 and the wave form charts shown in FIGS. 7A to 7G, 8A to 8G and 9A to 9G. FIGS. 7A to 7G show wave form charts of signals when no angular velocity is applied to the transducer 23 which is in balance of mass, that is, the ideal transducer 23. FIG. 7A shows the drive signal 25 outputted from the driving circuit portion 33, FIG. 7B shows the monitor signal outputted from the band-pass filter 312, FIG. 7C shows a differential sense signal outputted from the differential amplifier 343, FIG. 7D shows a signal outputted from the clock generation circuit 345, FIG. 7E shows a signal inputted into the synchronous detector 346, FIG. 7F shows a signal outputted from the synchronous detector 346, and FIG. 7G shows an angular velocity signal outputted from the low-pass filter 347. In a case where the ideal transducer 23 is used, as is shown in FIG. 7G, the angular velocity signal with the level of zero is outputted from the low-pass filter 347, and it is therefore understood that the angular velocity is detected precisely.

Figure 8A:
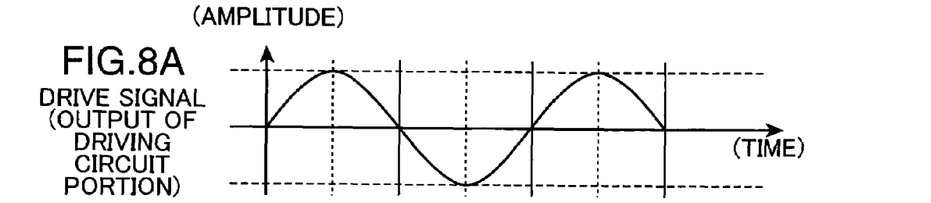
FIGS. 8A, 8B, 8C, 8D, 8E, 8F and 8G show wave form charts of signals in a conventional angular velocity sensor when no angular velocity is applied to a transducer which is out of balance of mass.
Figure 8B:
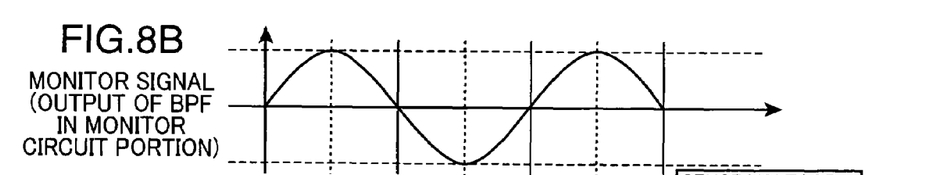
Figure 8C:
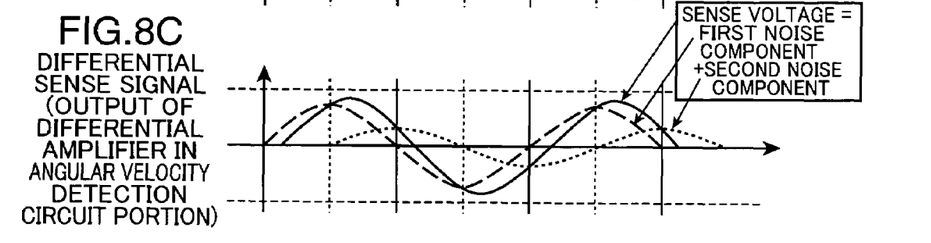
Figure 8D:
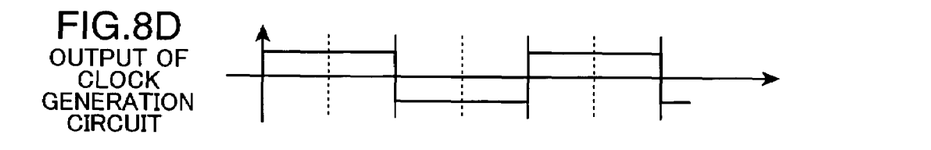
Figure 8E:
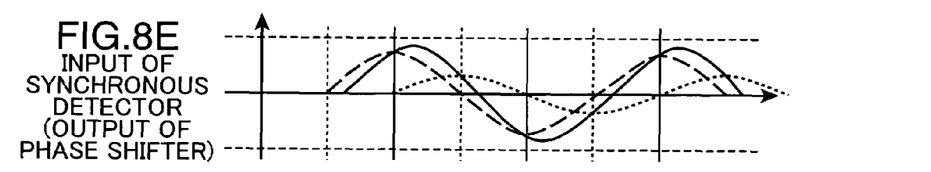
Figures 8F, 8G:
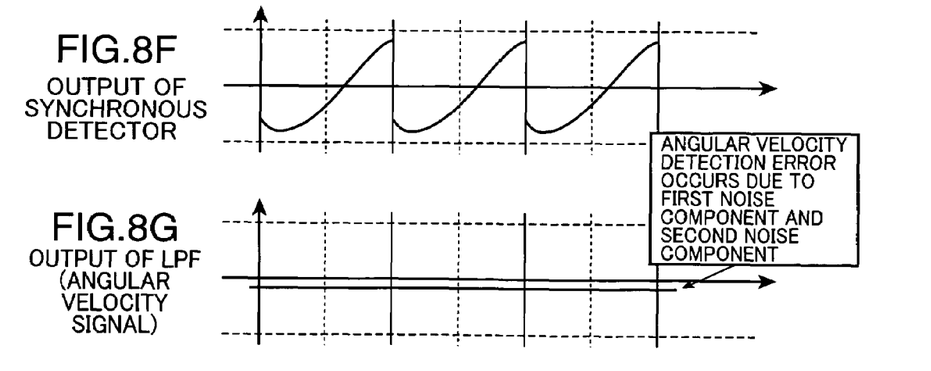

FIGS. 8A to 8G show wave form charts of signals in the conventional angular velocity sensor using a transducer 3 which is out of balance of mass when no angular velocity is applied to the transducer 3. FIGS. 8A to 8G correspond to FIGS. 7A to 7G, respectively. In a case where no angular velocity is applied to the transducer 3, ideally speaking, a differential sense signal with the level of zero as is shown in FIG. 7C is supposed to be outputted from the differential amplifier (343). However, in a case where the transducer 3 is out of balance of mass, a sense signal shown in FIG. 8C, that is, a sense signal containing the first noise component and the second noise component, is outputted from the differential amplifier (343). Consequently, an angular velocity signal without the level of zero as is shown in FIG. 8G is undesirably outputted from the low-pass filter (347).

Figure 9A:
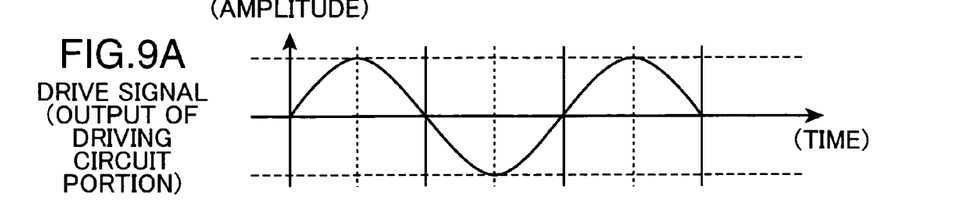
FIGS. 9A, 9B, 9C, 9D, 9E, 9F and 9G show wave form charts of signals in the angular velocity sensor of the present embodiment when an angular velocity is applied to the transducer.
Figure 9B:
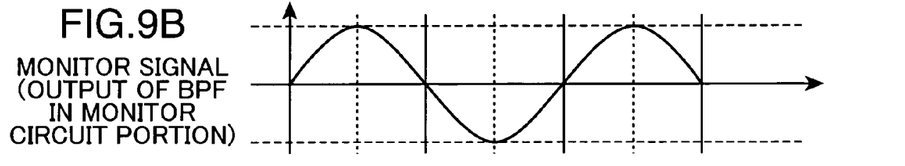
Figure 9C:
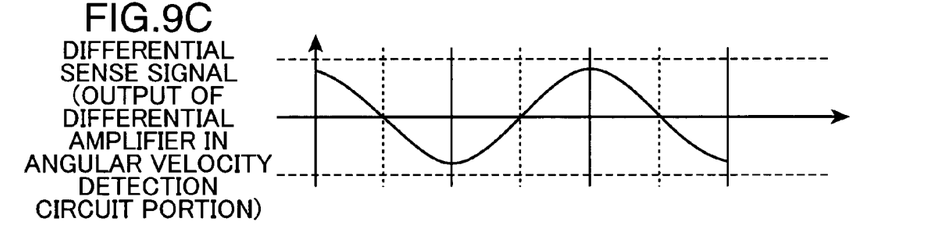
Figure 9D:
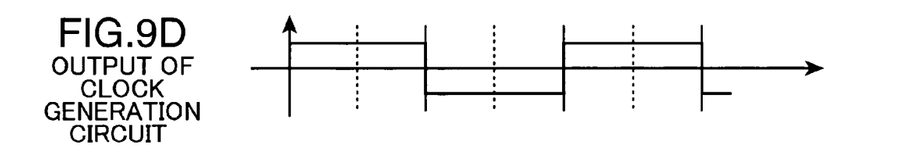
Figure 9E:
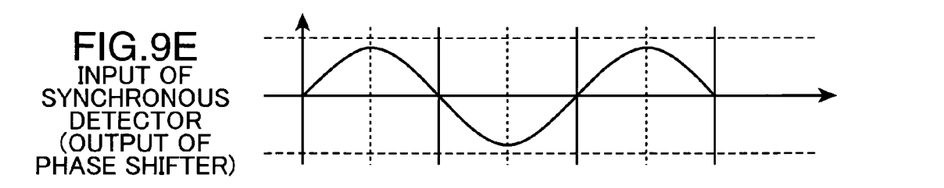
Figure 9F:
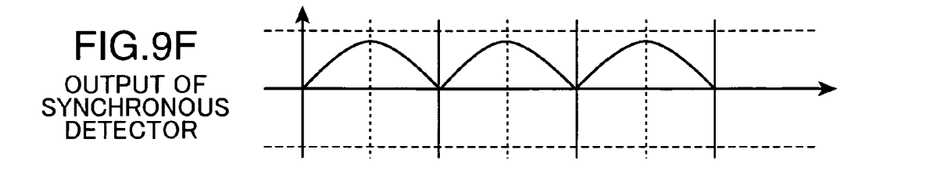
Figure 9G:
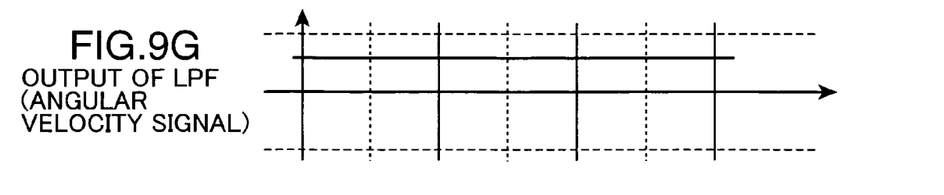

FIGS. 9A to 9G show wave form charts of signals in the angular velocity sensor of the present embodiment when an angular velocity is applied to the transducer 23. FIGS. 9A to 9G correspond to FIGS. 8A to 8G, respectively. In this angular velocity sensor, the correction signals generated in the correction circuit portion 35 are superimposed on the sense signals inputted into the respective input terminals of the differential amplifier 343. Hence, neither the first noise component nor the second noise component is contained in the differential sense signal shown in FIG. 9C. The angular velocity signal shown in FIG. 9G is thus unsusceptible to the first noise component and the second noise component. It is therefore possible to detect a precise angular velocity.

As has been described, according to the angular velocity sensor of the present embodiment, because the noise components contained in the sense signals 29 resulting from the mass balance of the transducer 23 are removed by the correction signals generated in the correction circuit portion 35, a precise angular velocity can be detected.

Also, the memory portion in which noise components are stored in advance, is connected to the correction circuit portion 35 to generate the correction signals according to the data stored in advance in the memory portion 38, and based on the correction signals, the noise components are constantly removed from the signal components of the sense signals 29. It is therefore possible to constantly detect a precise angular velocity while the angular velocity sensor is in an operating state.

In addition, circuits formed by combining the switch portion 39 having internal resistance and the ladder resistor 40 are provided in the correction circuit portion 35, and the resistance value of the ladder resistor 40 is set to be at least 100 times as large as the resistance value of the internal resistance of the switch portion 39. This configuration makes ON-resistance smaller when the switching portion 39 is switched ON from the OFF state, which can in turn improve the impedance matching.

Regarding the noise components, the one generated in a state where the phase of the monitor signal 27 and the phase of the sense signal 29 are not shifted from each other is assumed as the first noise component, and the correction circuit portion 35 is provided with the first noise correction circuit 36 for an exclusive use to remove the first noise component. It is thus possible to remove the first noise component exactly among plural noise components.

Also, regarding the noise components, the remaining noise component after the first noise component generated in a state where the phase of the monitor signal 27 and the phase of the sense signal 29 are not shifted from each other is removed and that is generated in a state where the phase of the monitor signal 27 and the phase of the sense signal 29 are shifted from each other, is assumed as the second noise component. The correction circuit portion 35 is provided with the second noise correction circuit 37 for an exclusive use to remove the second noise component. It is thus possible to remove the second noise component exactly among plural noise components.

Because both the monitor signal 27 and the sense signals 29 are amplified, respectively, in the amplifier 311 and the amplifiers 341 and 342 while the degrees of amplification are set to be almost equal, the second noise component can be removed at a higher degree of accuracy.

It should be appreciated that, in this embodiment, after the noise components are extracted and stored in the memory portion 38, the noise signal terminal 41 may be brought into a non-conducting state. In this case, because the noise signal terminal 41 is brought into the non-conducting state, it is possible to suppress the occurrence of adverse effects on the angular velocity sensor caused when an unwanted current flows into the noise signal terminal 41 during the fabrication sequence or after the incorporation in the mounting board.

The present invention can be summarized as follows.

(1) A transducer and a control circuit portion that drives the transducer and detects an angular velocity applied to the transducer are provided. In the transducer, a drive electrode portion into which is inputted a drive signal to oscillate the transducer at a specific frequency, a monitor electrode portion that detects an oscillation frequency of the transducer and outputs the detected oscillation frequency as a monitor signal, and a sense electrode portion that outputs a sense signal which is generated due to an angular velocity applied to the transducer and is synchronized with the monitor signal, are formed. A correction circuit portion is provided that removes, as a noise component, a signal component of the sense signal detected erroneously as if an angular velocity occurred when no angular velocity is occurring in the transducer, from a signal component of the sense signal.

With this configuration, the signal component of the sense signal detected erroneously as if an angular velocity occurred when no angular velocity is occurring in the transducer is deemed as the noise component, and removed from the signal components of the sense signal detected by the sense electrode portion when the angular velocity occurs. The noise component due to the mass balance of the transducer is thus removed from the sense signal, which in turn enables the angular velocity to be detected precisely.

(2) In the above configuration, it is preferable that a memory portion for storing in advance data to generate the correction signal is further included, and that the correction circuit portion generates the correction signal based on the data stored in advance in the memory portion, and constantly removes the noise component from the signal components of the sense signal by superimposing the generated correction signal on the sense signal.

With this configuration, the noise component is stored in the memory portion, and the correction circuit portion corrects the sense signal by removing the noise component stored in the memory portion from the sense signal. It is therefore possible to perform the correction processing on the sense signal at a high speed and a higher degree of accuracy.

(3) In the above configuration, it is preferable that the memory portion includes a data input terminal for the data to be stored, and that the data input terminal is brought into a conducting state when the data is stored in the memory portion, and brought into a non-conducting state after the data has been stored in the memory portion.

With this configuration, after the data is stored in the memory portion, the noise signal terminal is brought into a non-conducting state. It is therefore possible to suppress the occurrence of adverse effects on the angular velocity sensor caused when an unwanted current flows into the noise signal terminal during the fabrication sequence or after the incorporation into the mounting board.

(4) In the above configuration, it is preferable that the correction circuit portion includes a ladder resistor and a switch portion that adjusts a resistance value of the ladder resistor according to the data stored in the memory portion, and generates the correction signal by attenuating the monitor signal using the ladder resistor.

With this configuration, the resistance value of the ladder resistor is adjusted according to the data stored in the memory portion, and the correction signal is generated so that the monitor signal is attenuated by the ladder resistor. It is thus possible to remove the noise component from the signal component of the monitor signal at a higher degree of accuracy.

(5) In the above configuration, it is preferable that the resistance value of the ladder resistor is set to be at least 100 times as large as a resistance value of internal resistance of the switch portion.

With this configuration, because the resistance value of the ladder resistor is set to be at least 100 times as large as the internal resistance of the switch portion, the ON-resistance becomes smaller when the switch is switched ON from the OFF state. It is therefore possible to improve the impedance matching between the ladder resistor and the switch portion.

(6) In the configuration above, it is preferable that the noise component contains a first noise component generated in a state where a phase of the sense signal is not shifted with respect to a phase of the monitor signal, and that the correction circuit portion includes a first noise correction circuit that removes the first noise component.

With this configuration, the first noise correction circuit is provided, which is a circuit for an exclusive use to remove, from the sense signal, the first noise signal component which is the noise component generated in a state where the phase of the monitor signal and the phase of the sense signal are not shifted from each other. It is therefore possible to remove the first noise component from the sense signal at a high speed and a higher degree of accuracy.

(7) In the configuration above, it is preferable that the noise component contains a second noise component except for the first noise component, that is generated due to a phase shift between the monitor signal and the sense signal, and that the correction circuit portion includes a second noise correction circuit that removes the second noise component.

With this configuration, the second noise correction circuit is provided, which is a circuit for an exclusive use to remove, from the sense signal, the second noise component which is the noise component generated due to a phase shift between the monitor signal and the sense signal. It is therefore possible to remove the second noise component from the sense signal at a high speed and a higher degree of accuracy.

(8) In the above configuration, it is preferable that a monitor amplifier that amplifies the monitor signal and a sense amplifier that amplifies the sense signal are included, and that degrees of amplification of the monitor amplifier and the sense amplifier are made equal.

With this configuration, because the degree of amplification of each of the monitor amplifier and the sense amplifier is made equal, the second noise component can be removed at a higher degree of accuracy.

(9) In the above configuration, it is preferable that the noise component is a signal component generated due to a mass balance of the transducer.

With this configuration, it is possible to remove the noise component generated due to the mass balance of the transducer from the sense signal, which enables the angular velocity to be calculated precisely.

INDUSTRIAL APPLICABILITY

The angular velocity sensor of the present invention is able to calculate the angular velocity precisely because the noise components generated due to the mass balance of the transducer are removed from the signal components of the sense signals, and is therefore applicable to uses for posture control, navigation, or the like of a mobile unit such as an airplane, an automobile, a robot, a ship, a vehicle, or the like.

The invention claimed is:

1. An angular velocity sensor comprising:
   a transducer; and a control circuit portion operable to drive the transducer and to detect an angular velocity applied to the transducer, wherein the transducer includes a drive electrode portion into which is inputted a drive signal to oscillate the transducer at a specific frequency, a monitor electrode portion operable to detect an oscillation frequency of the transducer and to output the detected oscillation frequency as a monitor signal, and a sense electrode portion operable to output a sense signal which is generated due to an angular velocity applied to the transducer and is synchronized with the monitor signal, and wherein the control circuit portion includes a correction circuit portion operable to:

remove a noise signal component, caused by a mass balance of the transducer, of the sense signal detected erroneously, as if an angular velocity is occurring in the transducer due to the mass balance of the transducer when no angular velocity is occurring in the transducer, from a signal component of the sense signal;

generate a correction signal by attenuating the monitor signal; and constantly remove the noise signal component from the sense signal by superimposing the generated correction signal on the sense signal.

2. The angular velocity sensor according to claim 1, further comprising a memory portion for storing in advance data to remove the noise signal component from the signal component of the sense signal, wherein the correction circuit portion is further operable to generate the correction signal by attenuating the monitor signal, based on the data stored in the memory portion.

3. The angular velocity sensor according to claim 2, wherein:

the memory portion includes a data input terminal for the data to be stored; and the data input terminal is brought into a conducting state when the data is stored in the memory portion, and brought into a non-conducting state after the data has been stored in the memory portion.

4. The angular velocity sensor according to claim 2, wherein:

the correction circuit portion includes a ladder resistor and a switch portion operable to adjust a resistance value of the ladder resistor according to the data stored in the memory portion, and to generate the correction signal by attenuating the monitor signal using the ladder resistor.

5. The angular velocity sensor according to claim 4, wherein:

the resistance value of the ladder resistor is set to be at least 100 times as large as a resistance value of internal resistance of the switch portion.

6. The angular velocity sensor according to claim 1, wherein:

the noise signal component contains a first noise signal component generated in a state where a phase of the sense signal is not shifted with respect to a phase of the monitor signal; and the correction circuit portion includes a first noise correction circuit operable to remove the first noise signal component.

7. The angular velocity sensor according to claim 6, wherein:

the noise signal component contains a second noise signal component except for the first noise component, that is generated due to a phase shift between the monitor signal and the sense signal; and the correction circuit portion includes a second noise correction circuit operable to remove the second noise signal component.

8. The angular velocity sensor according to claim 1, further comprising:

a monitor amplifier operable to amplify the monitor signal, and a sense amplifier operable to amplify the sense signal, wherein degrees of amplification of the monitor amplifier and the sense amplifier are made equal.

* * * * *